Sept. 12, 1967 G. R. GAULD 3,340,811
PIEZOELECTRIC DELAYED SQUIB INITIATOR
Filed May 20, 1966
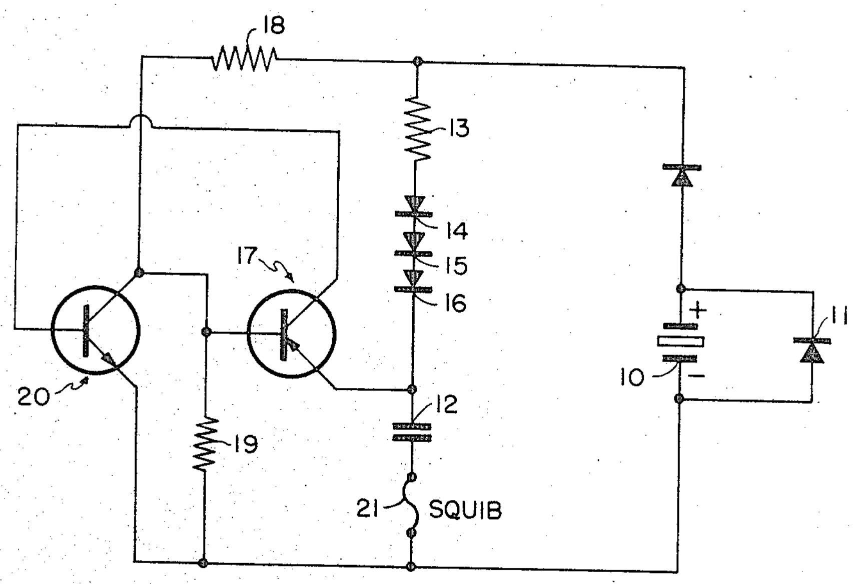
INVENTOR.
GODFREY R. GAULD
BY Alden D. Redfield
Charles M. Hogan
ATTORNEYS.

United States Patent Office 3,340,811

Patented Sept. 12, 1967

3,340,811

PIEZOELECTRIC DELAYED SQUIB INITIATOR

Godfrey R. Gauld, Richmond, Ind., assignor to Avco Corporation, Richmond, Ind., a corporation of Delaware Filed May 20, 1966, Ser. No. 551,713
5 Claims. (Cl. 102—70.2)

ABSTRACT OF THE DISCLOSURE

This is a firing circuit. A transistorized electronic switch is associated with a piezoelectric generator and two biasing circuits. The first biasing circuit intercouples the generator and the switch in such a way that when the generator is charged the switch is reverse biased. A second biasing circuit consisting of a string of diodes and a storage capacitor also intercouples the generator and switch so that as the generator discharges the capacitor accumulates charge from the generator; as the generator discharges the switch becomes forward biased. The switch becomes conductive when the forward bias prevails. The storage capacitor is connected in series with a firing squib across the switch so that it discharges and fires the squib as the switch becomes conductive.

The present invention relates to piezoelectric fuzes and, more specifically, to an improved circuit for igniting a squib.

A primary object of the invention is to provide a transistorized circuit for igniting the squib, which circuit is powered entirely by a piezoelectric generator.

Another major object of the invention is to provide an arrangement, in which the squib is fired at the end of a delay following the occurrence of a mechanical effect, and in which the magnitude of the delay is automatically functionally related to the magnitude of the mechanical effect.

For a better understanding of the invention, together with other and further objects, advantages, and capabilities thereof, reference is made to the following description of the appended drawing, the single figure of which is a circuit schematic of a preferred form of squib-firing circuit in accordance with the invention.

The circuit consists of a piezoelectric crystal 10 which is so arranged that it is left in the charged state at the termination of whatever impulse or mechanical effect initiates the delay. A major fraction of the energy on the crystal is transferred to a storage capacitor 12 which acts as a reservoir for the firing energy and as a voltage base for the threshold of the delay timer. The rate of the continued discharge of the crystal is used to determine the time delay. This time delay is the time required for the crystal to discharge by an amount equal to the forward voltage drop of the diode string 14, 15, and 16. The expiration of the time delay is detected by the novel threshold detector and switch which uses two cascaded transistors 17, 20 to release the stored charge of 10 into the load squib 21.

The invention operates in such a way that if the initial velocity of a fired round, in which the invention is installed, is relatively low, the delay between the occurrence of the mechanical effect and the firing of the squib is large. On the other hand, if the initial velocity of the round is relatively great, then the delay is less. Restating this operation, the magnitude of the delay is inversely related to the magnitude of the setback forces involved in firing the round. Consequently, the distance which a round would travel before the initiation of the squib would be more or less independent of the muzzle velocity.

The mechanical effect referred to herein is the decompression of a piezoelectric crystal 10 which occurs when the round is fired. Ways and means to cause a crystal to assume a charge are per se well known to those skilled in the art. In accordance with the invention there is provided the combination of the crystal 10, a storage capacitor 12 in circuit with the squib 21, switching means 17, 20 arranged in such a manner that it is open or nonconducting whenever the base of 17 is at a higher potential than the emitter and closed or conducting whenever the base of 17 is at a lower potential than the emitter, and means 13, 14, 15, 16, 18 for establishing the base of 17 at a higher potential than the emitter upon decompression of the piezoelectric generator 10 and, after the expiration of a suitable delay, bringing the potential of the base of 17 to a lower level than that of the emitter of 17.

All power in this circuit is derived from the crystal 10, which is shunted by a diode 11 in such a manner that the crystal is discharged through the diode 11 when the crystal is compressed. As the crystal is decompressed at the end of setback, it is charged with the polarity indicated. The crystal is encircuited with the storage capacitor 12 by a network comprising resistor 13 and the diode chain 14–16. A single Zener diode may be substituted for the elements 14–16. The storage capacitor 12 is in series with the squib 21 in the form essentially of an ignitable wire.

N-P-N type transistor 20 and P-N-P type transistor 17 are regeneratively connected with the collector of each connected to the base of the other. The emitters of this regenerative connection are in series with the storage capacitor 12 and igniter 21 to provide a high current discharge path for the storage capacitor. The action of crystal 10 charges capacitor 12 in a manner hereinafter described, but after that capacitor is charged, the crystal, being connected across a voltage divider network comprising resistors 18 and 19, biases the base of transistor 17 in such a direction as to hold the transistor nonconductive until a substantial amount of the charge on crystal 10 has dissipated. It will be understood that a tap on this voltage divider is connected to the base of transistor 17.

The operation of this device is such that the squib 21 is ignited by the passage of a surge or discharge current from capacitor 12. The capacitor is discharged through the pair of transistors 17 and 20 which are connected regeneratively. It will be seen that the capacitor 12 corresponds in a broad sense to a battery which has its positive terminal connected to the emitter of the P-N-P type transistor and its negative terminal connected to the emitter of the N-P-N type transistor. That is to say, the capacitor 12 is charged in such a manner that, considered alone, it tends to forwardly bias both emitter-base junctions and to reverse bias both collector-base junctions, so that when capacitor 12 acquires a sufficient charge the two transistors become conductive and discharge capacitor 12. The capacitor discharge path is via the emitter of 17, then via two branches of which one comprises the collector of 17 and the base of 20 and the other comprises the base of 17 and the collector of 20, and finally via the emitter of 20 and through the squib 21 back to the capacitor 12. But capacitor 12 is not the only element which determines the bias on the various junctions. A bias more positive than that imparted to the emitter of transistor 17 is applied to the base of that transistor by the crystal 10 which is shunted by a voltage dividing network comprising resistors 18 and 19, which biasing network maintains the voltage at the base of transistor 17 more positive than the voltage at the emitter of transistor 17 until crystal 10 has dissipated much of its own charge. The collector current of transistor 17 renders the base of transistor 20 more positive and the effect is cumulative. When both transistors are turned on, capacitor 12 discharges through squib 21 and initiates firing of the squib.

The delay time in this circuit is determined by the time required for crystal 10 sufficiently to discharge so that the base-emitter junction of the P-N-P type transistor 17 becomes forward biased. Since the drop in voltage which will result in this condition is just the potential difference between the emitter and the base of 17 immediately following the initial discharge of 10 into 12, and since this potential difference is very nearly equal to the forward voltage drop across the diodes 14–16, it will be seen that the delay is determined by this forward voltage drop and by the rate of discharge of the crystal 10. Since this rate of discharge is increased by an increased voltage on 10 and decreased by a decreased voltage on 10, the time delay will be longer for the higher than for the lower voltage.

It will be observed that the crystal 10 is the power supply for the circuit.

When the setback forces are smaller, the crystal voltage is initially lower and the time delay is greater. This is an automatic compensating feature when the squib is used, for example, in mortar fire.

It will be seen that the invention comprises essentially the combination of a transistorized switch, a discharge capacitor for applying to that switch a bias which causes it to become conductive, and means including a piezoelectric crystal and a network for not only charging the capacitor but also for maintaining a threshold bias on the switch such that the charge on the capacitor will not cause the switch to become conductive until the threshold established by the network and by the piezoelectric crystal diminishes sufficiently to permit conductivity to occur. The network comprises a voltage divider and also connections for charging the capacitor 12.

A typical cycle of operation begins with the crystal in discharge condition, the crystal 10 having become discharged by the diode 11 when the crystal is mechanically compressed (by means not shown). As the crystal 10 releases at the beginning of the cycle it is charged in the positive direction as indicated. The capacitance of the crystal then discharges into capacitor 12 which results in a voltage on the crystal and on the capacitor of about $$\frac{C_x}{C_x+C}V_o$$

where $V_o$ is the original voltage on the crystal. The voltage on capacitor 12 is lower (say 2 volts) than on the crystal 10 because of the voltage drop across the forward biased diodes 14, 15 and 16. That is to say, the voltage on the capacitor 12 is established at an amount less than the voltage on the crystal at the end of discharge.

The transistor 17 is held off by the reverse bias on its emitter-base junction, the emitter being less positive than the base. There being no discharge path for the capacitor 12, the voltage across this element 12 remains substantially constant. The capacitance of the crystal 10 continues to discharge through the path comprising resistors 18 and 19. When the crystal 10 is sufficiently discharged, the emitter-base junction of transistor 17 becomes forward biased and this transistor beings to conduct. Its collector current flows in the base circuit of transistor 20 turning on transistor 20. Since transistor 20 is in shunt with resistor 19, transistor 20 shorts 19 rendering the base of 17 more negative and turning on transistor 17 regeneratively.

In one successful embodiment of the invention, the parameters were as follows:

| | | |
|---|---|---|
| Transistor **17** | | Type 2N851 |
| Transistor **20** | | Type 2N706 |
| Resistor **13** | ohms | 270,000 |
| Resistor **18** | do | 33,000 |
| Resistor **19** | do | 3,000,000 |
| Capacitor **12** | microfarads | 5 |
| Diode **11** | | Type AM704A |
| Diode **14** | | Type AM704A |
| Diode **15** | | Type AM704A |
| Diode **16** | | Type AM704A |
| Crystal **10** | | Laminated PZT5 |

These values resulted in a delay time of 2.5 seconds and the delivery to the load of about 400 ergs of energy. For the purposes of the test the crystal was simulated by a capacitor of .5 microfarad which was charged to 200 volts. This capacitance and voltage are commensurate with the state-of-the-art in piezoelectric devices and are essentially the same as those which are characteristic of a laminated piezoelectric crystal which was assembled for the purpose.

While there has been shown and described what is at present considered to be the preferred form of the invention, it will be understood by those skilled in the art that various changes and modifications may be made therein without departing from the scope of the invention as defined by the appended claims.

I claim:

1. The combination of:
 - a storage capacitor;
 - a first transistor of one conductivity type and having a first emitter, base and collector;
 - a second transistor of the opposite conductivity type and having a second emitter, base and collector;
 - a connection between the first collector and the second base;
 - a connection between the second collector and the first base, whereby the transistors are regeneratively arranged, the emitters being encircuited with the storage capacitor and firing squib in such a manner that the charge on the capacitor tends to render the second transistor conductive so that the capacitor may discharge through the transistors;
 - a piezoelectric generator;
 - and means for coupling the generator to the storage capacitor and also to the second transistor, said means comprising a voltage divider connected across said piezoelectric generator and having a tap connected to the base of said second transistor in such manner that the transistors are biased into nonconductivity whenever the piezoelectric crystal is charged and remain nonconductive until the charge on said piezoelectric crystal drops below a predetermined value, said coupling means further including a diode chain encircuited between said generator and the connection point between said second emitter and said storage capacitor.

2. The combination in accordance with claim 1 in which the coupling means further includes a resistance in series with the diode chain.

3. The combination in accordance with claim 2 in which a firing squib is included in series circuit with said storage capacitor, whereby as the transistors become conductive and the capacitor discharges, the squib is fired.

4. The combination of a transistorized electronic switching means adapted to be forward biased into conductivity and reverse biased into nonconductivity;
 - a piezoelectric generator adapted to be charged to provide a voltage of predetermined polarity;
 - a first biasing circuit for intercoupling the piezoelectric generator and the switching means in such a manner that, when the generator is charged, the switching means is reverse biased into nonconductivity;
 - a second biasing circuit comprising a chain of diodes and a storage capacitor for intercoupling the generator and the switching means in such a way that, as the generator discharges the capacitor is charged by the generator to forward bias the switching means in a conductive direction;
 - the switching means becoming conductive when the charge on the generator drops so low that the forward bias exceeds the reverse bias;
 - the storage capacitor being connected in a discharge path with the switching means whereby it discharges as the switching means becomes conductive.

5. The combination of claim 4 and a firing squib in said discharge path.

References Cited

UNITED STATES PATENTS

| | | | |
|---|---|---|---|
| 1,807,708 | 6/1931 | Ruhlemann | 102—70.2 |
| 2,934,017 | 4/1960 | Ellet | 102—70.2 |
| 2,981,890 | 4/1961 | Ruehlemann | 102—70.2 X |
| 2,985,837 | 5/1961 | Ruehlemann et al. | 102—70.2 X |
| 2,991,716 | 7/1961 | Israel et al. | 102—70.2 |
| 3,218,470 | 11/1965 | Padgett et al. | |
| 3,225,695 | 12/1965 | Kapp et al. | 102—70.2 |

FOREIGN PATENTS 909,549 10/1962 Great Britain.

OTHER REFERENCES

"Applications and Circuit Design Notes," by Solid State Products, Inc., published September 1960; pertinent pages are 5, 6 and 22.

SAMUEL FEINBERG, *Primary Examiner.*

BENJAMIN A. BORCHELT, *Examiner.*

W. C. ROCH, *Assistant Examiner.*